United States Patent [19]

Cykana et al.

[11] Patent Number: 5,560,677

[45] Date of Patent: Oct. 1, 1996

[54] SEAT WELTING

[75] Inventors: Daniel Cykana, Sheboygan; Bradley J. Bruggink, Plymouth; John A. Meyer, Sheboygan, all of Wis.

[73] Assignee: Bemis Manufacturing Company, Sheboygan Falls, Wis.

[21] Appl. No.: 210,702

[22] Filed: Mar. 18, 1994

[51] Int. Cl.⁶ .................................................. A47C 27/00
[52] U.S. Cl. .................................. 297/218.3; 297/218.5; 297/463.1
[58] Field of Search .................. 297/218.1, 218.3, 297/218.4, 218.5, 219.1, 226, 452.1, 440.1, 440.11, 452.38, 452.58, 452.59, 463.1; 5/402, 409, 410

[56] References Cited

U.S. PATENT DOCUMENTS

| | | |
|---|---|---|
| 1,419,270 | 6/1922 | King et al. . |
| 2,107,446 | 2/1938 | Koliba . |
| 3,008,154 | 11/1961 | Honeyman ................................. 5/339 |
| 3,102,755 | 9/1963 | Wilfert . |
| 3,233,253 | 2/1966 | Cauvin .................................... 5/353.1 |
| 3,273,178 | 9/1966 | Baruth et al. . |
| 3,671,984 | 6/1972 | Ambrose ................................... 5/353.1 |
| 3,711,151 | 1/1973 | Upton ........................................ 297/45 |
| 3,981,534 | 9/1976 | Wilton . |
| 4,065,182 | 12/1977 | Braniff et al. ........................... 297/452 |
| 4,105,244 | 8/1978 | Colby ......................................... 297/45 |
| 4,465,534 | 8/1984 | Zelkowitz . |
| 4,526,420 | 7/1985 | Kawamura et al. . |
| 4,558,904 | 12/1985 | Schultz . |
| 4,579,383 | 4/1986 | Colby ......................................... 297/45 |
| 4,786,103 | 11/1988 | Selbert . |
| 4,789,201 | 12/1988 | Selbert . |
| 4,798,416 | 1/1989 | Faust et al. . |
| 4,861,104 | 8/1989 | Malak . |
| 4,867,507 | 9/1989 | Arai . |
| 5,015,034 | 5/1991 | Kindig et al. . |
| 5,058,955 | 10/1991 | Sugiura et al. . |
| 5,067,773 | 11/1991 | Koa . |

FOREIGN PATENT DOCUMENTS 507210   6/1939   United Kingdom ...................... 5/410

Primary Examiner—Milton Nelson, Jr.
Attorney, Agent, or Firm—Michael, Best & Friedrich

[57] ABSTRACT

A co-extruded welting for fixing a seat cover to a vehicle seat frame, the welting comprising an elongated, single-piece strip including a web having opposite ends and a pair of edges extending between the opposite ends, and the strip also including a sheath extending along one of the edges between the opposite ends, the wed and the sheath being made of a first plastic material, and a core surrounded by the sheath and made of a second plastic material which is different from the first plastic material.

10 Claims, 2 Drawing Sheets

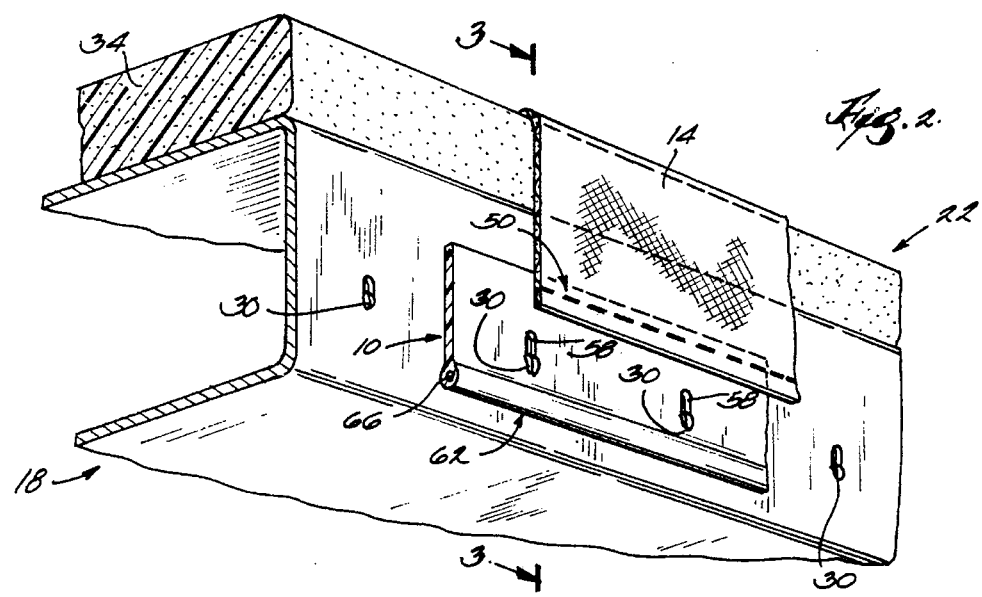
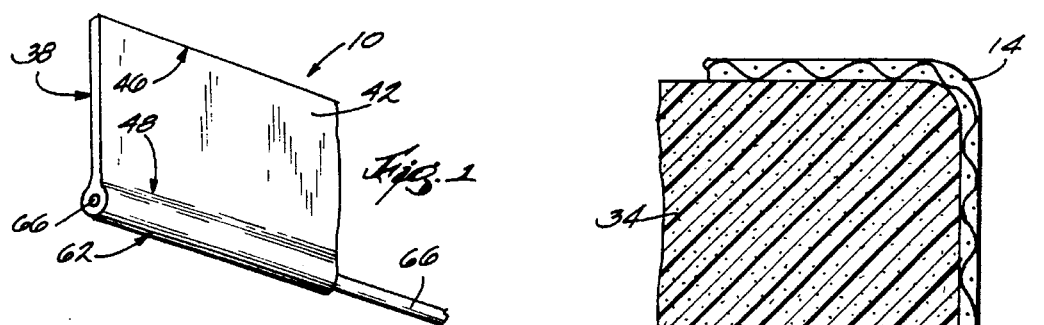
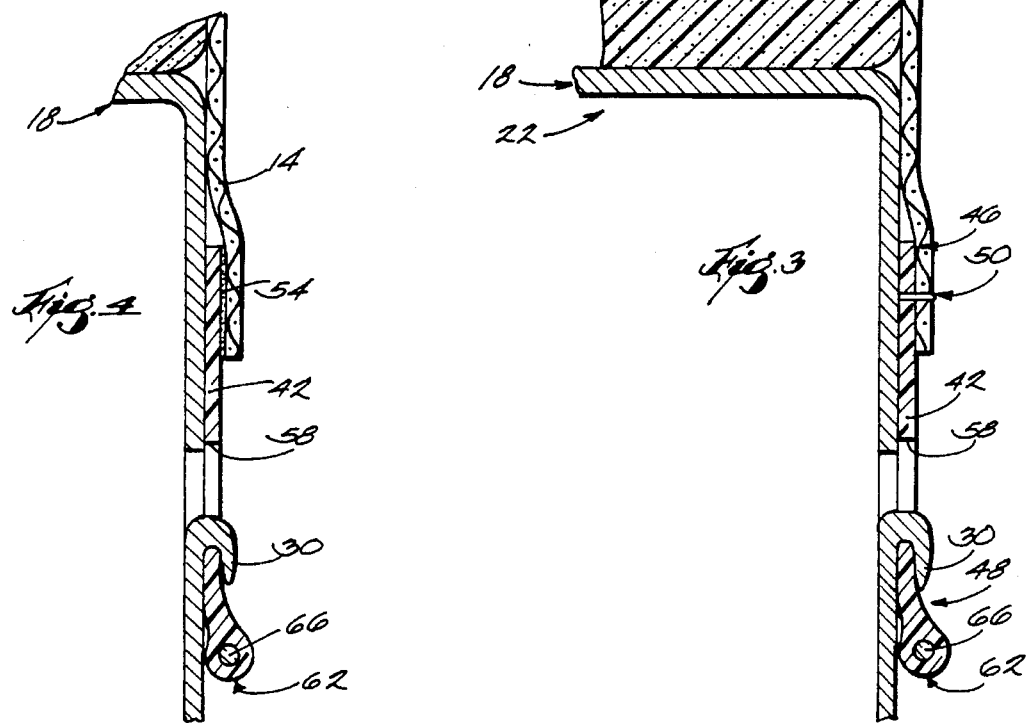

SEAT WELTING

BACKGROUND OF THE INVENTION

1. Technical Field

The invention relates generally to apparatus for fixing a seat cover to a seat frame, and more specifically to a reinforced seat welting. The invention also relates to seat weltings that are made of extruded plastic.

2. Related Prior Art

It is generally known to fix a seat cover to a seat frame with a seat welting. In such an arrangement, the seat cover surrounds a seat cushion supported by the frame and has a peripheral edge to which the seat welting is fastened. The seat welting can be fixed to the seat cover by sewing, stapling, with an adhesive, or by a combination of these methods. The seat welting is, in turn, fastened to the seat frame.

The seat welting can be fixed to the seat frame by a fastener or "hog ring" that surrounds a portion of the seat frame and that pierces the seat welting. It is also known to fix a welting to a seat frame by configuring the welting and a portion of the seat frame to be engageable with an interference fit. For example, it is known to provide a channel on the seat frame and to configure the seat welting so that the welting can be moved or snapped into the channel. An example of such an arrangement is shown in U.S. Pat. No. 3,273,178, which issued to Baruth et al. on Sep. 20, 1966.

It is also known to fix a welting to a seat frame by providing one or more projections on the frame and by providing a corresponding number of apertures in the welting. The welting is then pulled over the seat frame and fitted onto the projections. In such an arrangement, the engagement between the projections and the welting, and the tension in the seat cover, retains the welting on the seat frame.

In general, a seat welting provides a strip of material which is sufficiently flexible to be attached to the seat cover, and which has a sufficient strength to withstand the stresses placed on the welting during the assembly of the seat and during use of the seat. Accordingly, reinforced seat weltings are also generally known. For example, it is known to provide a reinforced seat welting by enclosing a flexible, incompressible material such as a rope or cord within a loop of fabric. An example of such a welting is illustrated in U.S. Pat. No. 4,558,904, which issued to Schultz on Dec. 17, 1985.

It is also generally known to provide a seat welting including an elongated member that is fixed to the seat cover and that is made of an extruded plastic material. Such extruded weltings are illustrated and described in the above referenced U.S. Pat. No. 3,273,178 and in U.S. Pat. No. 4,465,534, which issued to Zelkowitz on Aug. 14, 1984.

Because a seat welting is usually fixed first to a seat cover and then fixed to the frame, the welting should be somewhat pliant so as to be easily worked and positioned onto the frame. However, the welting should not be so flexible so as to be limp. Rather, the welting should have a "memory set" and be bendable into a position which it will retain until it is repositioned.

One of the problems associated with some known seat weltings is that the weltings include multiple parts requiring assembly before the weltings can be fixed to a seat cover or to a seat frame. Other difficulties encountered with known weltings include: a lack of sufficient strength to withstand the stresses placed on the welting; stiffness or inflexibility; and complete flexibility without a "memory set."

SUMMARY OF THE INVENTION

The invention provides a single-piece seat welting which is made by co-extruding two dissimilar plastic materials. The seat welting includes an elongated web and a tubular sheath integrally formed with the web, both of which are made of a first plastic material, such as polyvinyl chloride. The welting also includes a core that is housed by the sheath and that is formed with the web and the sheath by co-extrusion. The core is made of a second plastic material which is different from the first plastic material, and which may be a cellulosic propionate.

A feature of the welting is the provision of a single-piece welting having a web that is flexible and a core that has a memory set and a relatively high shear strength. The welting does not require assembly of components and facilitates the assembly of a seat cover, cushion and seat frame.

Other features and advantages of the invention will become apparent to those skilled in the art upon review of the following detailed description, claims and drawings.

DESCRIPTION OF THE DRAWINGS

FIG. 1 is a perspective view, partially broken away for illustration, of a seat welting embodying the invention.

FIG. 2 is a partial perspective view of a seat assembly including a seat frame, seat cushion, seat cover and the seat welting shown in FIG. 1.

FIG. 3 is a cross-section view taken along line 3—3 in FIG. 2.

FIG. 4 is a view similar to FIG. 3 illustrating a seat assembly that is a first alternative embodiment of the invention.

Figure 5:
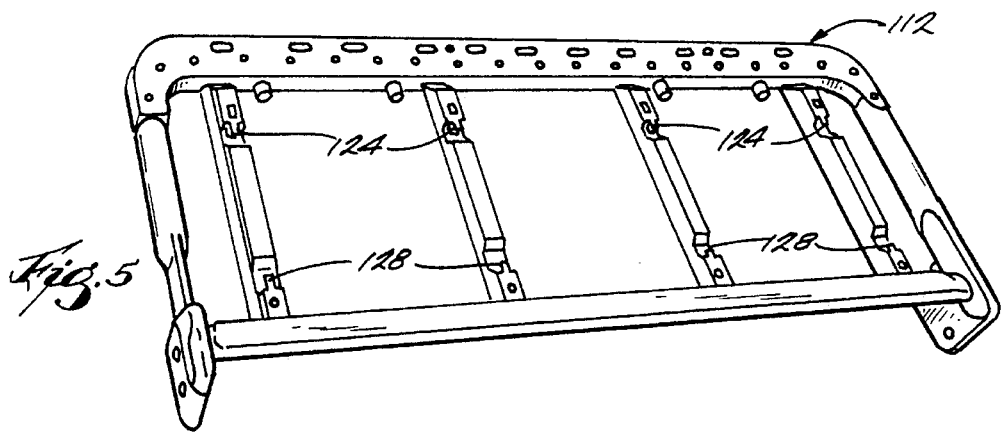
FIG. 5 is a perspective view of a seat frame that is part of a second alternative embodiment of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENTS

The drawings illustrate (see FIG. 2) a seat welting 10 which embodies the invention and which is used to fix a seat cover 14 to a seat frame 18. In particular, FIGS. 2 and 3 illustrate a seat assembly 22 including a portion of the seat frame 18 having a plurality of projections or hooks 30, a seat cushion 34 supported by the seat frame 18, a portion of the seat cover 14 partially surrounding the seat cushion 34, and the seat welting 10 which is fixed to the seat cover 14 and to the seat frame 18. The seat welting 10 connects the seat cover 14 and the frame 18 so that the seat cover 14 is held in tension against the seat cushion 34.

FIG. 1 illustrates a portion of the welting 10 that has been partially formed. The welting 10 is made by co-extruding two dissimilar plastic materials. The welting 10 includes a single-piece, elongated first portion or strip 38 made of a first plastic material. The first portion 38 includes a web 42 having opposite edges 46, 48 extending along the length of the welting 10. The web 42 has a generally uniform thickness between the edges 46, 48 and, as shown in FIG. 2, is fixed to the seat cover 14 along the edge 46. The web 42 and seat cover 14 shown in FIGS. 2 and 3 are fastened along a sewn seam 50. However, the web 42 and seat cover 14 can also be fastened by staples or other fasteners (not shown), by an adhesive between the web 42 and the seat cover 14 or by a combination of sewing, fasteners and adhesives. FIG. 4 illustrates an alternative embodiment of the invention in which the web 42 and the cover 14 are fastened by an adhesive 54.

The welting 10 illustrated in FIG. 1 has been coextruded but has not been perforated to be engageable with the projections 30 on the frame member 26. As shown in FIG. 2, however, when the welting 10 has been fully formed, the web 42 has therein a plurality of perforations or slots or openings 58 which are spaced apart so as to receive the projections 30 on the frame 18.

The first portion 38 of the welting 10 also includes (see FIGS. 1 and 3) a generally tubular sheath 62 extending along the edge 48 of the web 42. The sheath 62 is integrally formed with the web 42 and extends along the length of the welting.

The welting 10 also includes (FIGS. 1 and 3) a second portion or core 66 made of a second plastic material which is different from the first plastic material. The core 66 is surrounded by the sheath 62 and extends along the length of the welting 10. As best shown in FIG. 3, the thickness or diameter of the core 66 is somewhat greater than the thickness of the web 42. The core 66 is appropriately sized so as to have a shear strength of between seventeen and twenty-four psi (preferably between twenty and twenty-one psi) and has a sufficient strength to withstand the stresses placed on the welting 10 during the fabrication and use of the seat assembly 22.

The core 66 is relatively inflexible compared to the first portion 38 of the welting 10 but is not brittle. Also, the core 66 has a memory set so as to retain a position into which it is moved until it is repositioned. The core 66 facilitates the fabrication of the seat assembly 22, particularly the fitting of the welting 10 over the frame 18 and onto the projections 30, by being bendable into a shape or position approximating the shape of the frame 18 and by retaining that shape during assembly with the frame 18.

The first and second plastic materials used for the strip 38 and the core 66 are different in that they are polymers based upon distinct respective monomers. In particular, the material for the strip 38, i.e., the web 42 and the sheath 62, is preferably a relatively flexible plastic that is sufficiently flexible to be attached to the seat cover 14. A suitable material for the strip 38 is polyvinyl chloride (PVC). The material for the core 66 is preferably a cellulosic propionate.

As mentioned above, the strip 38 (the web 42 and the sheath 62) and the core 66 are co-extruded. A conventional extruding machine can be used to co-extrude the dissimilar plastic materials. A suitable extrusion machine is made by the Davis Standard Company.

After co-extrusion, the welting 10 is cut to length and the web 42 perforated. The welting 10 can then be fixed to the seat cover 14 and to the frame 18.

Figure 6:
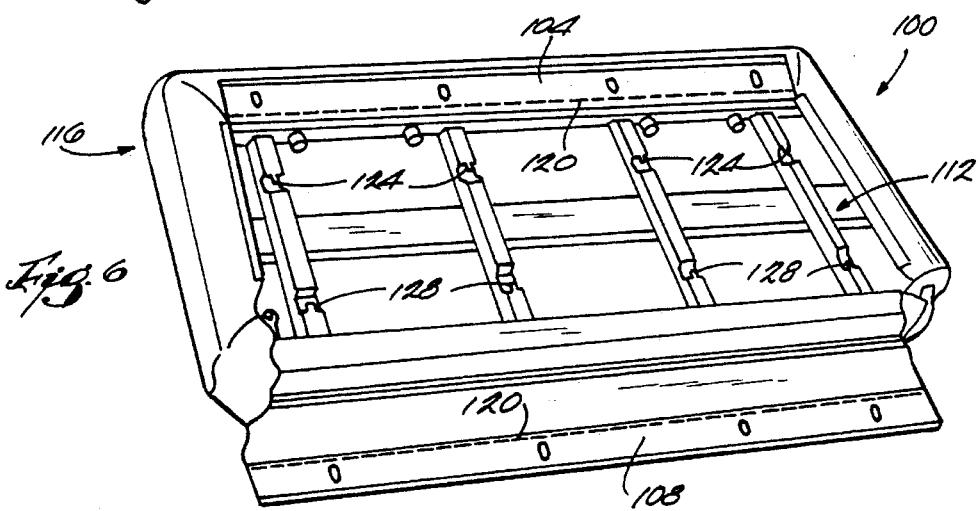
FIG. 6 is a view similar to FIG. 5 showing a seat cover around the frame of FIG. 5.
Figure 7:
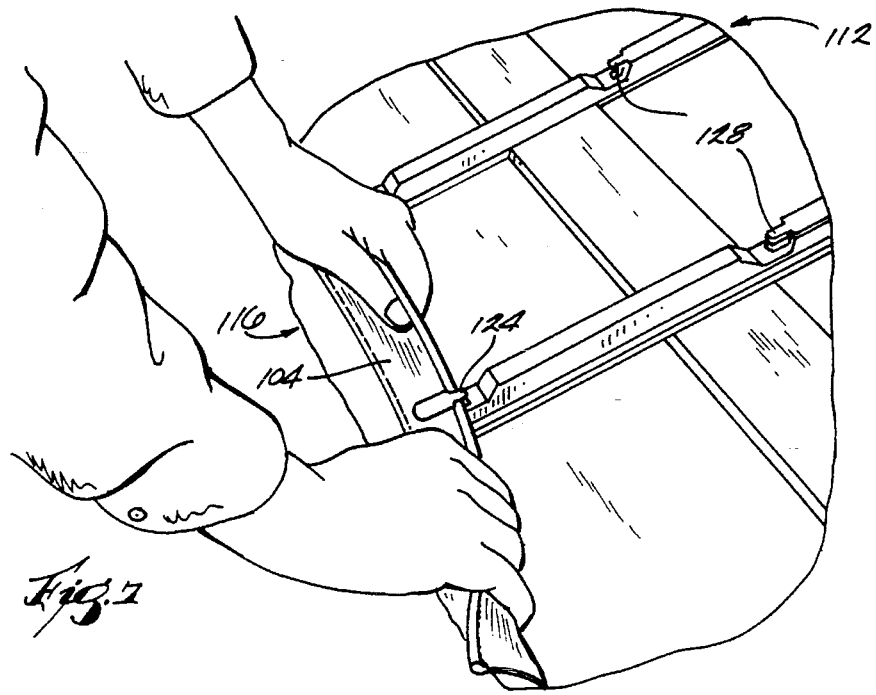
FIG. 7 is a partial perspective view of the seat cover of FIG. 6 being secured to the frame.

A seat assembly 100 that is a second alternative embodiment of the invention is illustrated in FIGS. 5 through 7. The assembly 100 includes (see FIG. 6) weltings 104 and 108 that are identical to the welting 10, and common elements have been given the same reference numerals. The assembly 100 also includes a frame 112 and a seat cover 116 over the frame. The weltings 104 and 108 are sewn (indicated by reference numeral 120) to opposite sides of the cover 116. The welting 104 is shown in FIG. 6 flipped up over the portion of the cover to which the welting 104 is attached. The frame 112 has thereon projections 124 for the welting 104 and projections 128 for the welting 108. FIG. 7 shows the welting 104 being secured to the projections 124.

Various features of the invention are set forth in the following claims.

We claim:

1. A welting for fixing a seat cover to a vehicle seat frame, said welting comprising an elongated, single-piece strip including a web having opposite ends and a pair of edges extending between said opposite ends, and said strip also including a sheath extending along one of said edges between said opposite ends, said strip being made of a first plastic material, and a core which is surrounded by said sheath, which is co-extruded with said strip, and which is made of a second plastic material different from said first plastic material whereby said strip and core form a single-piece welting.

2. A welting as set forth in claim 1 wherein said first plastic material is a polyvinyl chloride, and wherein said second plastic material is a cellulosic propionate.

3. A welting as set forth in claim 1 wherein said web has a generally uniform thickness, and wherein said core has a thickness greater than said thickness of said web.

4. A welting as set forth in claim 1 wherein said web is relatively flexible, and wherein said core is relatively inflexible and has a memory set.

5. A welting as set forth in claim 1 wherein said web is sufficiently flexible to be fixed to the seat cover along said edge which is opposite said sheath and to be perforated between said edges to receive portions of said frame.

6. A welting as set forth in claim 1 wherein said core has a shear strength of at least approximately seventeen psi.

7. A seat assembly comprising a seat frame having thereon a plurality of projections, a seat cover over said frame, and a welting for fixing said seat cover to said seat frame, said welting including a first portion made of a first plastic material, said first portion including an elongated web having opposite edges, said web being fixed to said seat cover along one of said edges and having therein, between said opposite edges, a plurality of openings each receiving a respective one of said seat frame projections, and said first portion including a tubular sheath extending along the other of said edges, and said welting also including a second portion made of a second plastic material which is different from said first plastic material, said second portion being surrounded by said sheath, said first and second portions being formed by co-extrusion to form a single-piece welting.

8. An assembly as set forth in claim 7 wherein said first plastic material is a polyvinyl chloride, and wherein said second plastic material is a cellulosic propionate.

9. An assembly as set forth in claim 7 wherein said web has a generally uniform thickness, and wherein said core is generally cylindrical and has a diameter greater than said thickness of said web.

10. An assembly as set forth in claim 7 wherein said web is relatively flexible, and wherein said core is relatively inflexible and has a memory set.

* * * * *